(12) United States Patent
Diekhans

(10) Patent No.: US 6,257,072 B1
(45) Date of Patent: Jul. 10, 2001

(54) MEASURING DEVICE FOR MOBILE HARVESTING MACHINES

(75) Inventor: Norbert Diekhans, Gutersloh (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/231,106

(22) Filed: Jan. 14, 1999

(30) Foreign Application Priority Data

Jan. 16, 1998 (DE) .............................. 198 01 335

(51) Int. Cl.[7] .................................................. G01F 1/66
(52) U.S. Cl. ...................................................... 73/861.26
(58) Field of Search ....................... 73/861.26; 340/684; 460/7, 1

(56) References Cited

U.S. PATENT DOCUMENTS

| | | | | |
|---|---|---|---|---|
| 5,015,997 | * | 5/1991 | Strubbe | 340/684 |
| 5,173,079 | * | 12/1992 | Gerrish | 460/7 |
| 5,318,475 | * | 6/1994 | Schrock et al. | 460/1 |

FOREIGN PATENT DOCUMENTS

| | | | |
|---|---|---|---|
| 32 32 746 C2 | 3/1984 | (DE) | A01D/75/00 |
| 40 41 995 A1 | 7/1992 | (DE) | A01D/43/08 |
| 196 41 211 A1 | 3/1998 | (DE) | A01D/43/09 |

OTHER PUBLICATIONS

U.S. application No. 08/953,605, Diekhans, filed Oct. 17, 1997.

\* cited by examiner

*Primary Examiner*—Benjamin R. Fuller
*Assistant Examiner*—Jewel V. Thompson
(74) *Attorney, Agent, or Firm*—Husch & Eppenberger, LLC; Robert E. Muir; Kevin M. Kercher

(57) ABSTRACT

A mobile harvesting machine, in particular a forage harvester, has a measuring device for determining a parameter specific to crop material or conveyed material. Here the harvesting machine comprises an attachment for picking up the crop material and at least one implement for working the crop material. The measuring device in the harvesting machine is arranged on the path of crop material between the implement and the region in which the stream of crop material has been brought to its final stream width. In this region it is ensured that the stream of crop material exerts a low pressure on the measuring device. Another advantage is that due to the site of attachment, the pressure difference is minimal for different throughputs of crop material. This arrangement of the measuring device further allows good checking of the measuring device for wear and soiling and is easily accessible in case of possible repairs.

11 Claims, 3 Drawing Sheets

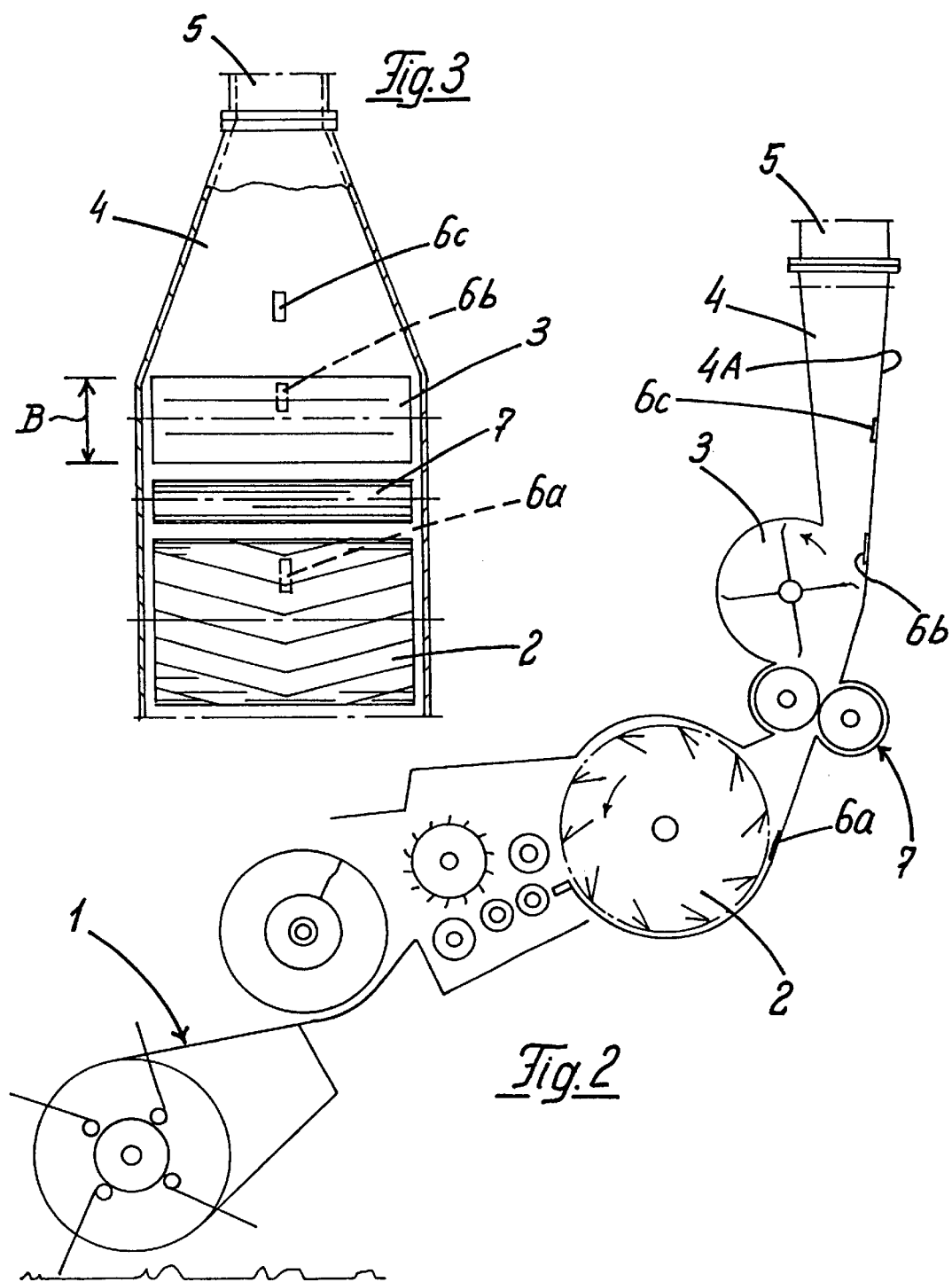

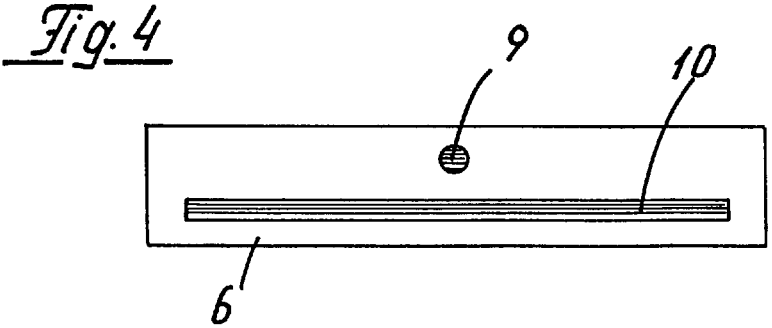
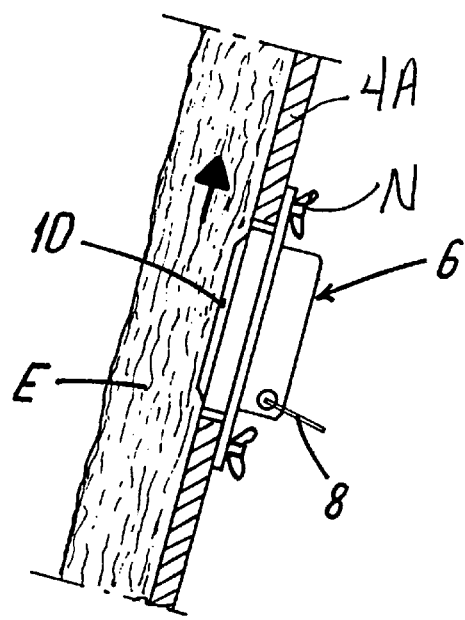
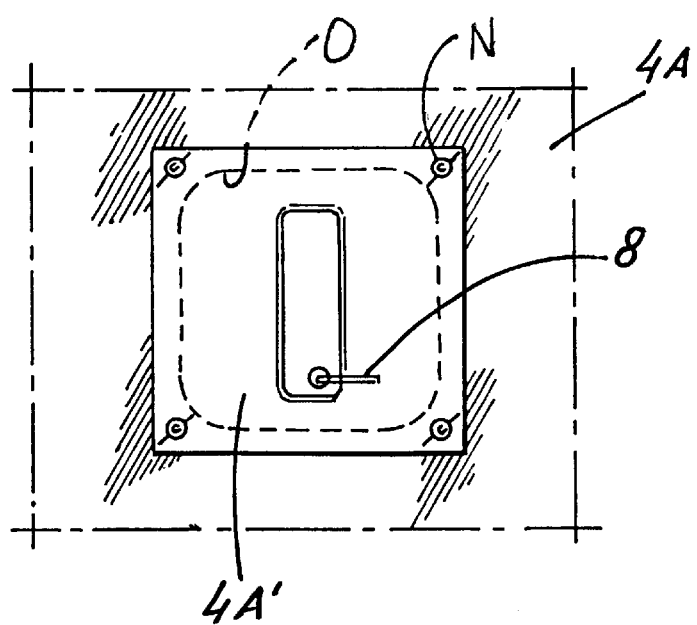

MEASURING DEVICE FOR MOBILE HARVESTING MACHINES

BACKGROUND OF THE INVENTION

The present invention relates generally to agricultural machinery such as mobile harvesting machines and, more particularly, to improvements to a measuring device for determining a parameter specific to a harvested crop material.

It is contemplated that the measuring device is on a mobile harvesting machine with an attachment for picking up the crop material and at least one implement for working the crop material. In one example the invention relates to a measuring device for determining a specific parameter, such as moisture and/or conveying, on a forage harvester for the harvesting of silage corn, wilted grass silage or whole crop silage.

German patent 32 32 746 C2 describes a mobile harvesting machine with a device for moisture measurement in the path of the crop material. The moisture measurement is significant in that the moisture content of the crop material in the silage has a critical influence on the subsequent silage quality. With excessively moist crop material or silage butyric acid bacteria may form, which impair the silage quality. These adverse resulting phenomena of excessively moist crop material can however be compensated to a large extent by the addition or admixture of additives on recovery of the crop material. The quantity of additives needed depends on the moisture of the crop material, which can be completely different even within one cutting. To be able to correctly dose addition of the additives, online moisture measurement by means of a corresponding measuring device directly on the path of the crop material through the harvesting machine, as described in German patent 32 32 746 C2, is necessary.

In practice the location of mounting and the position of fitting the measuring device within the path of the crop material is problematic, both with respect to a reliable measuring result and with respect to wear and soiling of the measuring device. Experiments with a measuring device, specifically a moisture sensor which measures the electrical conductivity of the crop material, fitted in the adjustable ejector flap of a forage harvester have shown that the measuring results varied for crop materials having the same moisture content depending on the angle of adjustment of the ejector flap. The apparent reason for this is that the angle between the stream of crop material and the measuring device and the associated contact pressure of the crop material on the moisture sensor differ depending on the angle of adjustment of the ejector flap. With this sensor the contact pressure, as a disturbance variable, has a great influence on the measured moisture value. However, to allow optimum filling of a truck or trailer moving parallel to the forage harvester, very frequent adjustment of the ejector flap is necessary. As a result, unreliable moisture measurement with high fluctuations of measured value is unavoidable.

In addition, a measuring device located in the ejector flap is subject to high abrasive wear by the impinging crop material which is greatly accelerated up to 70 m/s (about 230 ft./sec.) by an ejector blower. Thus, the durability of the measuring device is considerably reduced. The abrasive wear is further increased by the fact that under certain circumstances earth, small pieces of wood or stones cling to the crop material, which however cannot be prevented.

Very high wear and damage may occur even if the measuring device is located in front of the working unit, i.e. the blade drum or the chopper assembly, of the forage harvester. If this site is chosen, the precision of measurement is for example lower in case of moisture measurement, as only the surface moisture of the raw material and not the actual moisture of the chopped material is measured.

Other sites, for example in the ejector pipe bend, which of course exhibit lower abrasive wear, show the problem of soiling and poor accessibility of the measuring device. The fibrous crop material forms deposits, particularly in case of a high moisture content, when sufficient self-cleaning by the stream of crop material does not occur at the measuring point. This can lead to false or unusable measuring results.

In German patent 32 32 746 C2 these problems are not addressed. Only some basically possible locations for fitting a moisture measuring device on a combine harvester are proposed. Indications of suitable mounting locations and positions of the measuring device for solving the above-mentioned problems are not found therein.

It is therefore an object of the present invention to overcome one or more of the above-described deficiencies.

Another object is to mount a measuring device, known in the art for determining parameters specific to crop material and/or conveying on a mobile harvesting machine, in such a way that it delivers reliable measuring results and is moreover protected from wear and soiling.

SUMMARY OF THE INVENTION

In accordance with the present invention there is provided a measuring device having sensing means for determining a parameter specific to crop material and for use on a harvesting machine having an attachment for picking up crop material, at least one implement for working the crop material, and a conduit for carrying away the worked crop material, means for mounting the sensing means at a location between the implement and the conduit.

In accordance with another feature there is provided a mobile harvesting machine for harvesting agricultural crops and having an attachment for picking up crop material, at least one implement for working the crop material, and discharge means for conveying a stream of worked crop material from the machine, at least one measuring device on the harvesting machine for determining a parameter specific to crop material and which is arranged on the path of crop material between the implement and a region in which the stream of crop material has been brought to its conveyed stream width in the discharge means.

The aforementioned objects are achieved by the arrangement of the measuring device on the path of crop material between the implement and the region in which the stream of crop material has been brought to its final stream width. In this region the influence of disturbance variables is at its lowest. The orientation of the stream of crop material to the measuring device is always the same here, as a result of which reliable detection of measured values is ensured without disturbing and irritating fluctuations.

Furthermore, a constant low pressure is exerted on the measuring device in this region because the measuring device either does not deflect or merely slightly deflects the stream of crop material. Hence the abrasive wear on the measuring device is minimal, and the pressure difference for varying throughputs of crop material is small.

The contact pressure is of course low, but nevertheless is sufficient for the measurement of the moisture by means of the electrical conductivity. Furthermore, contacting of the stream of crop material with the measuring device can be improved by measuring electrodes engaging in the stream of material.

As oncoming crop material is conducted constantly over the measuring device in this region, cleaning also takes place, which prevents soiling. Even if deposits have formed in a harvesting interval, they are released again after brief operation of the harvesting machine.

The invention is not confined to measuring devices for determining moisture. It is generally applicable to measuring devices used to determine other parameters of crop material.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 2 is a diagrammatic side view of the path of the crop material through the forage harvester;

FIG. 3 is a sectional view of a blade drum/chopper assembly and an ejector blower showing possible measuring points;

FIG. 4 is a top view of a measuring device advantageously in the form of a moisture sensor;

FIG. 5 is a side view of a measuring device mounted on a wall of the ejector shaft and crop material moving past it; and FIG. 6 is a plan view of a check flap in the ejector shaft and having a built-in measuring device.

DETAILED DESCRIPTION

Figure 1:
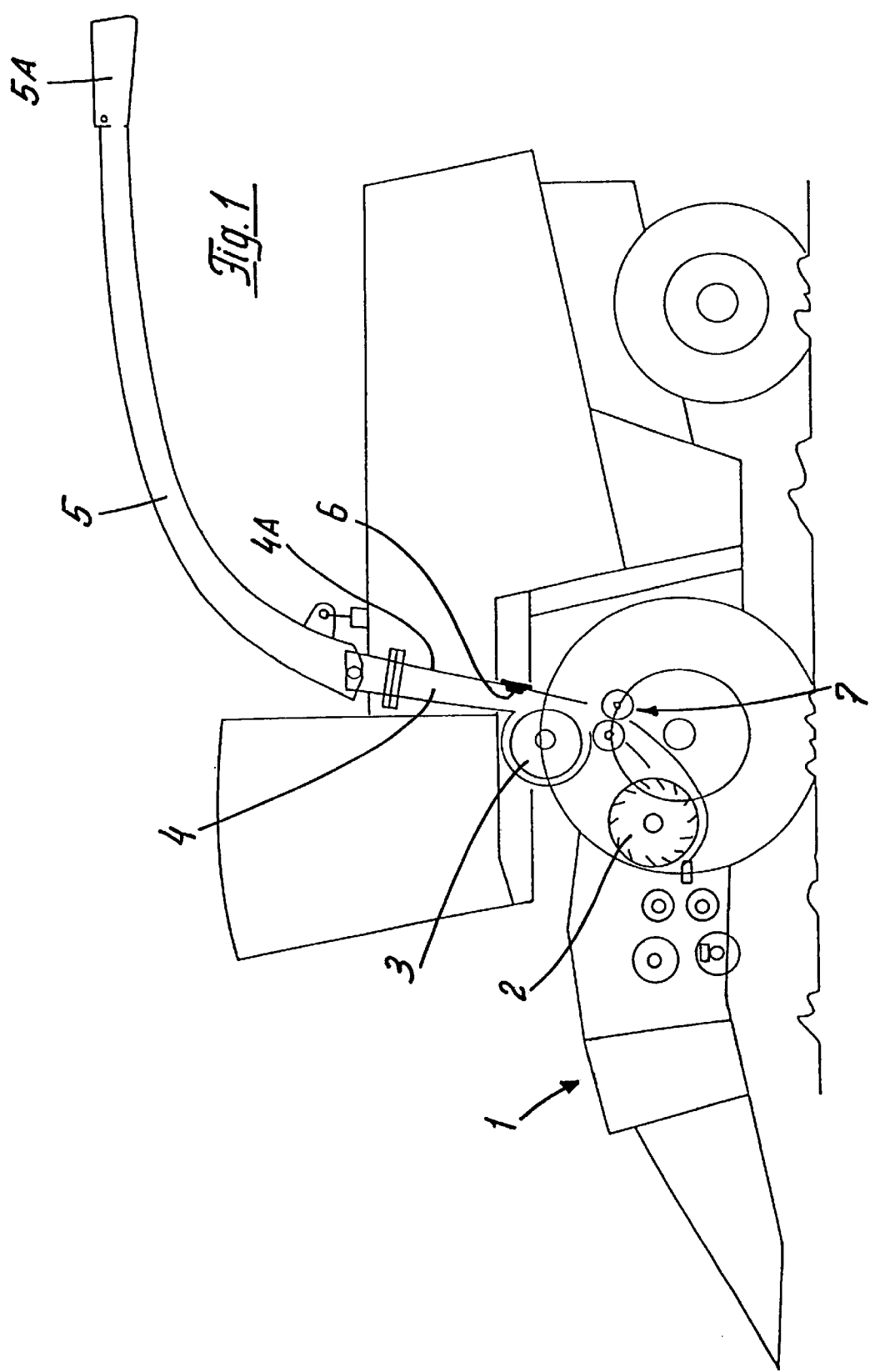
FIG. 1 is a side view of a forage harvester.

FIG. 1 shows a forage harvester with an attachment, generally designated 1, here shown as a corn harvester. The forage harvester has an implement in the form of a blade drum/chopper assembly 2, an ejector blower/ejector accelerator 3 with ejector shaft 4, and an adjoining ejector pipe 5 with ejector flap 5A. A measuring device 6 is advantageously located in an attached position directly behind the ejector blower 3. In this region the relatively thin stream of crop material is reduced from the width of the ejector blower to the width of the ejector pipe 5. The planar ejector shaft wall 4A maintains the direction of the stream of material. A corn cracker 7 serves the purpose of providing for optimum opening of the corn kernels and is located between the blade drum 2 and the ejector blower 3.

FIG. 2 shows a larger scale view of the path of the crop material through a forage harvester. Here the attachment 1 is in the form of a pick-up which serves to pick up wilted grass silage. Three preferred sites for locating the measuring device are shown by way of example in FIG. 2. These sites are in the region of the path of the crop material between the chopper drum 2 and the bend of the ejector pipe, and are located:

a) directly behind the chopper drum 2 at position 6a, b) directly behind the ejector blower 3 at position 6b, and c) at a distance—by order of magnitude, one to two times the diameter B of the ejector blower—downstream of the ejector blower 3 at position 6c.

FIG. 3 is a section through the path of the crop material in the harvesting machine transverse to the direction of travel. The preferred possible mounting sites 6a, 6b, and 6c are shown here again from another viewpoint. Mounting the measuring device 6 in the respective middle of the shaft is particularly advantageous because in case of small quantities of crop material the stream of material passes mainly in the middle of the shaft where small streams of crop material can be detected. For more accurate determination of measured values it is advantageous to mount several either identical or different measuring devices in the region described.

FIG. 4 shows by way of example an active sensor surface of a measuring device 6, advantageously for determining moisture by conductivity measurement via two electrodes 9, 10.

FIG. 5 schematically shows how the crop material E is conveyed past the measuring device 6 parallel to the electrodes, e.g. electrode 10, which are connected to wires 8. In another embodiment the device 6 is arranged to measure the volume, i.e. throughput, of conveyed crop material E. It can be seen that such conveying does not exert great pressure on the measuring device 6.

FIG. 6 shows a preferred mounting of the measuring device 6 on the wall 4A. Here the device 6 is mounted in a check flap 4A' which covers an inspection opening O in the wall 4A, and which is conveniently removably mounted by wingnuts N. The check flap 4A' may also be pivotably mounted. This check flap 4A' provides a means to inspect or check the impeller elements of the ejector blower 3. This type of mounting makes checking of the measuring device very simple during visual checks of the ejector blower 3. Furthermore there is also ease of access to the measuring device 6 in case of possible repair or replacement of the device. The electrical connecting wires 8 (shown at an alternate location from those in FIG. 5) can be easily installed in the readily accessible space behind the ejector shaft 4.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a mobile harvesting machine for harvesting agricultural crops and having an attachment for picking up crop material, at least one implement for working the crop material, and discharge means for ejecting a stream of the crop material from the machine; an improvement comprising:

at least one measuring device on the harvesting machine for determining a parameter specific to crop material and which is arranged on a path of the crop material between the at least one implement for working the crop material and a region in the discharge means at the final width of the stream of the crop material prior to discharge of the crop material from the discharge means.

2. A mobile harvesting machine according to claim 1, wherein said measuring device is arranged directly behind the at least one implement for working the crop material.

3. A mobile harvesting machine according to claim 1, wherein said discharge means is an ejector shaft, and said measuring device is mounted on a wall of the ejector shaft.

4. A mobile harvesting machine according to claim 3, wherein the ejector shaft wall has an inspection opening therein; including a check flap removably covering the inspection opening; and wherein said measuring device is mounted on the check flap.

5. A mobile harvesting machine according to claim 4, wherein said check flap is pivotably mounted on the ejector shaft wall.

6. A mobile harvesting machine according to claim 1, wherein said measuring device is arranged in a middle of the stream of crop material.

7. A mobile harvesting machine according to claim 1, wherein said measuring device is a sensor for moisture measurement.

8. A mobile harvesting machine according to claim 1, wherein said measuring device is a device for determining throughput of the crop material.

9. A measuring device having sensing means for determining a parameter specific to crop material and for use on a harvesting machine, wherein the harvesting machine includes an attachment for picking up crop material, at least one implement for working the crop material fluidly connected to an ejector, wherein the ejector is fluidly connected to a conduit for carrying away the crop material; an improvement comprising: a means for mounting a sensing means at a location between the implement and the conduit.

10. A measuring device according to claim 9, wherein the measuring device is operative for determining throughput of the crop material.

11. A measuring device according to claim 9, wherein the measuring device is operative for determining moisture content of the crop material.

* * * * *